United States Patent
Landes

(10) Patent No.: US 7,556,585 B2
(45) Date of Patent: Jul. 7, 2009

(54) MACHINE DRIVE LINE OVERSPEED PROTECTION METHOD

(75) Inventor: James W. Landes, East Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 389 days.

(21) Appl. No.: 11/455,552

(22) Filed: Jun. 19, 2006

(65) Prior Publication Data

US 2007/0293366 A1 Dec. 20, 2007

(51) Int. Cl.
*B60W 10/04* (2006.01)
(52) U.S. Cl. ........................ 477/107; 477/110
(58) Field of Classification Search ................ 477/107, 477/110
See application file for complete search history.

(56) References Cited

U.S. PATENT DOCUMENTS

| | | | |
|---|---|---|---|
| 3,721,309 A | 3/1973 | Donaldson | |
| 4,918,606 A | 4/1990 | Ito et al. | |
| 5,113,821 A | 5/1992 | Fukui et al. | |
| 5,233,523 A | 8/1993 | Follmer | |
| 5,435,131 A * | 7/1995 | Hausman et al. | 60/327 |
| 5,587,905 A * | 12/1996 | Yesel et al. | 701/53 |
| 5,669,850 A * | 9/1997 | Dourra et al. | 477/108 |
| 5,706,199 A | 1/1998 | Wilson et al. | |
| 5,896,083 A | 4/1999 | Weisman, II et al. | |
| 6,167,341 A | 12/2000 | Gourmelen et al. | |
| 6,240,356 B1 | 5/2001 | Lapke | |
| 6,405,119 B1 | 6/2002 | Linden | |
| 6,511,399 B2 | 1/2003 | McCollum Etchason | |
| 6,616,575 B1 | 9/2003 | Lorentz | |
| 6,679,134 B2 | 1/2004 | Shigyo | |
| 6,871,734 B2 | 3/2005 | Kupper et al. | |
| 7,011,197 B2 | 3/2006 | Labout | |
| 7,227,332 B2 * | 6/2007 | Suzuki et al. | 320/104 |
| 2004/0007206 A1 | 1/2004 | Houston | |
| 2005/0121243 A1 | 6/2005 | MacConney et al. | |

FOREIGN PATENT DOCUMENTS

WO WO 93/13340 7/1993

* cited by examiner

*Primary Examiner*—Ha D. Ho
(74) *Attorney, Agent, or Firm*—Liell & McNeil

(57) ABSTRACT

A method of controlling driveshaft speed includes generating an overspeed protection action signal if an engine speed limit and a requested transmission gear ratio correspond to a driveshaft overspeed condition. An operating method for a machine includes disengaging a relatively higher transmission gear, and inhibiting re-engagement of the higher transmission gear responsive to an overspeed protection action signal. An electronic controller for the machine is configured to generate an overspeed protection action signal responsive to an engine speed limit and requested transmission gear ratio.

15 Claims, 2 Drawing Sheets

MACHINE DRIVE LINE OVERSPEED PROTECTION METHOD

TECHNICAL FIELD

The present disclosure relates generally to methods and apparatuses for controlling the speed of a driveshaft of a machine drive line, and relates more particularly to inhibiting certain transmission gear ratios responsive to a driveshaft protection action signal.

BACKGROUND

Many modern machines have a relatively broad range of available transmission gear ratios. Given such flexibility in operation, wide variance may exist in transmission output shaft speed across the range of available gears and engine speeds. The driveshaft typically rotates in concert with the transmission output shaft and may therefore typically be operated in a similarly broad range of speeds. While many machine powertrain systems are intended to have broad flexibility, transmission and engine designs do not always account for certain hardware limitations of the machine, potentially leading to undesired stresses and strains during operation, and even failure of the equipment.

For instance, certain movable components of the powertrain, and in particular drive line components such as the driveshaft, may under certain operating conditions rotate at speeds in excess of the intended design. In other words, a given transmission gear ratio may be selected such that the transmission output speed, i.e. a driveshaft speed, at relatively high engine speeds may be greater than a predetermined speed limit for the driveshaft. In some instances, overspeeding of the driveshaft can cause it to orbit, resonantly vibrating. Under such conditions, the driveshaft can exert radial force on the transmission tailshaft which, if imparted at an appropriate frequency, may cause a resonant vibration in the engine/transmission package, and potentially damage the powertrain.

Engineers have addressed driveshaft and related overspeed problems in a variety of ways. One approach, commonly used in conventional passenger vehicles has been to design the powertrain components with sufficient robustness and mass moment that high driveshaft speeds, and associated resonant driveshaft vibrations, are not problematic. While this approach has been successful in some instances, other types of machines have powertrain hardware less readily modified.

In relatively large on-highway trucks, for example, a common approach to driveshaft overspeed problems has been to "gear bind" the transmission. In a typical gear binding strategy, certain transmission gears are made unavailable under all conditions, either by mechanically blocking their engagement in some way, or by electronically turning the gears off. In other words, even where the transmission has numerous theoretically available gears, the operator and/or control system is permanently prevented from engaging certain gears which have the potential to result in driveshaft speeds in excess of driveshaft speed limits.

While gear binding can have the intended effect of generally preventing driveshaft overspeed, it presents significant problems. Among these is the fact that it is inherently wasteful and cost ineffective to build a transmission with certain gears that are never used.

Another shortcoming of gear binding strategies relates to fuel economy. In order to operate a machine, such as an on-highway truck, at relatively higher speeds appropriate for on-highway travel, the unavailability of certain higher gears requires the machine to be operated at relatively high engine speeds to attain a desired ground speed. It is well known in the art that continually operating an engine toward the upper end of its speed range is characterized by less than optimum fuel economy. Nevertheless, it is common for operators to "redline" the machine for long periods of time, resulting in poor fuel economy because of the inability to switch into a higher gear that would provide for operation at relatively lower engine speeds. A driveshaft overspeed prevention approach is thus desirable which would allow the use of higher transmission gears when desired, but still provide a robust means of ensuring the driveshaft will not be driven at excessive speeds, and risk associated damage to powertrain components.

The present disclosure is directed to one or more of the problems or shortcomings set forth above.

SUMMARY OF THE DISCLOSURE

In one aspect, the present disclosure provides a method of controlling the speed of a driveshaft in a machine. The method includes the steps of receiving a requested transmission gear signal associated with a transmission gear ratio, determining an engine speed limit, and determining if the engine speed limit and the transmission gear ratio correspond to a driveshaft overspeed condition. The method may further include the step of generating an overspeed protection action signal if the engine speed limit and the transmission gear ratio correspond to a driveshaft overspeed condition.

In another aspect, the present disclosure provides a method of operating a machine including the steps of operating the machine in a relatively higher transmission gear, and operating the machine in a relatively lower transmission gear, including disengaging the relatively higher transmission gear. The method further includes the steps of receiving a request to re-engage the relatively higher transmission gear, determining an engine speed limit, and inhibiting re-engaging the relatively higher transmission gear responsive to an overspeed protection action signal that is based at least in part on the engine speed limit and a gear ratio associated with the relatively higher transmission gear.

In still another aspect, the present disclosure provides a machine including an engine, a driveshaft and a transmission coupled with each of the engine and the driveshaft. The machine further includes an operator input device configured to output a requested transmission gear signal associated with a gear ratio of the transmission, and at least one electronic controller coupled with the transmission and with the operator input device. The at least one electronic controller is configured via an overspeed protection control algorithm to generate a protection action signal responsive to the requested transmission gear signal and an engine speed limit if the gear ratio associated with the requested transmission gear and an engine speed limit correspond to a driveshaft overspeed condition.

DETAILED DESCRIPTION

Figure 1:
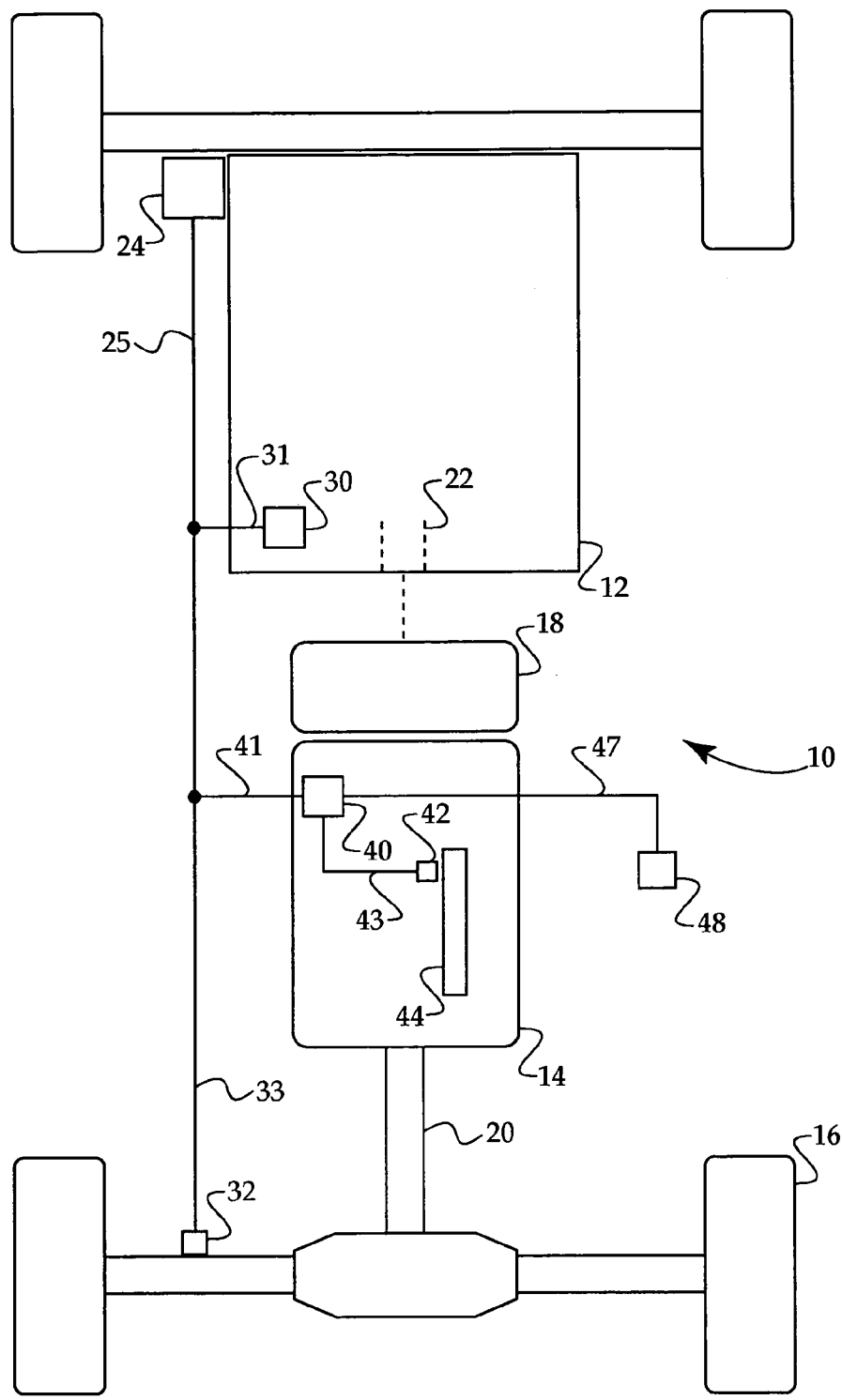
FIG. 1 is a schematic illustration of a machine according to the present disclosure.

Referring to FIG. 1, there is shown schematically a machine 10 according to one embodiment of the present disclosure. The machine 10 may be an on-highway truck, for example, but is not thereby limited, and the present disclosure should be considered to fairly encompass any machine having a drive line including a driveshaft and associated components which may benefit from driveshaft speed control. The machine 10 includes an engine 12, a transmission 14, and may include a plurality of wheels 16 or other ground engaging structures, such as tracks. It is contemplated that the transmission 14 may be an electronically controlled automatic transmission, however, in some instances manual transmissions or automatically shifted manual transmissions may be used. The transmission 14 may include a torque converter 18 coupled with a crankshaft 22 of the engine 12, and will typically include at least two forward gears, and may include five, six or more forward gears. An operator input device 48, such as a gearshift, may be coupled with the transmission controller 40 via a communication line 47. In certain embodiments, a multi-speed axle switch, providing low and high ranges may be used to provide further versatility to the available gear ratios for the machine 10. A driveshaft 20 is coupled with the transmission 14 and may be rotatable with an output shaft thereof to propel the wheels 16 and the machine 10 in a conventional manner. The machine 10 may include at least one electronic controller, for example an engine controller 30 and a transmission controller 40, the at least one electronic controller being configured to control engine speed and machine ground speed, and may be further configured to control driveshaft 20 speed via an overspeed protection strategy described herein.

The engine controller 30 may be coupled with an engine fueling controller or limiter device 24 via communication lines 31 and 25. For example, where the machine 10 is an on-highway truck, the engine controller 30 may be configured to limit the machine ground speed via controlling fueling of the engine 12, which in turn controls engine speed. Specifically, when ground speed reaches a maximum desired speed, fueling may be limited via the limiter device 24 to keep the ground speed within the desired range. To this end, the engine controller 30 may be further coupled via an additional communication line 33 with a ground speed sensor 32. Ground speed may be determined in any suitable manner, for example based on rotational speed of the wheels 16, via a ground speed radar signal, or by some other means such as sensing driveshaft 20 or transmission output shaft speed. The engine controller 30 may, for example, read a machine ground speed signal from the ground speed sensor 32 and responsively control engine speed by controlling the fuel supply thereto via the engine fueling controller 24. The engine controller 30 may further be configured to periodically broadcast both a machine ground speed and a governed engine speed, for example a high idle engine speed, for reasons that will be apparent from the following description.

The transmission controller 40, also in communication with the engine controller 30 via a communication line 41, will typically be configured to control engagement and disengagement of at least two forward gears, typically a plurality of gears corresponding to a plurality of different gear ratios of the transmission 14. The transmission controller 40 may be in control communication with an electro-hydraulic control valve 42, via yet another communication line 43, to control engagement and/or disengagement of one or more selected gears via a clutch actuator 44. A single clutch actuator 44 is illustrated for ease of description, however, it should be appreciated that a plurality of clutch actuators, each corresponding to a transmission gear having a gear ratio, might be components of the transmission 14.

In certain instances it may be desirable to inhibit operating of the machine in certain transmission gears to ensure that the driveshaft 20 does not rotate at speeds above a desired driveshaft speed limit. To this end, the transmission controller 40 may be configured to inhibit engagement of a relatively higher gear via control of a state or position of the valve 42 to selectively inhibit operation of the clutch 44. It should also be appreciated that various means are available for engaging and disengaging different transmission gears, and therefore the description of the electro-hydraulic control valve 42 should not be construed in a limiting sense. For example, in a manual transmission, an actuator might be used to inhibit upshifting to a relatively higher gear by mechanically blocking positioning of the operator input device 48 in a position associated with the subject gear. The present disclosure may fairly be considered to encompass any suitable means of selectively inhibiting engagement of a particular gear, and is applicable to both mobile machines and stationary machines such as generators, pumps, compressors and the like.

As set forth above, the present disclosure provides an overspeed protection strategy that includes a method of controlling the speed of the driveshaft 20 of the machine 10. Controlling driveshaft speed may include generating an overspeed protection action signal responsive to an engine speed limit and a requested transmission gear ratio of the machine 10 which correspond to a driveshaft overspeed condition. As set forth herein, the term "overspeed condition" should be understood as an operating condition where rotation of the driveshaft 20 above a driveshaft speed limit will occur or is considered likely to occur.

In particular, a driveshaft overspeed condition may occur where an engine speed limit such as a governed engine speed limit, divided by a given gear ratio such as the gear ratio provided by a relatively higher transmission gear, predicts a possible driveshaft speed for that combination of engine speed and gear ratio that exceeds a programmed driveshaft speed limit. The method may thus further include determining if the engine speed limit and the transmission gear ratio associated with a requested transmission gear signal received from the operator input device 48 correspond to a driveshaft overspeed condition.

The actual driveshaft speed limit may be based on a driveshaft speed that corresponds with resonant frequency vibrations of the driveshaft 20, for example, or it might be a different speed. In one example, the driveshaft speed limit may be about 3000 RPM, and the governed engine speed limit may be about 2100 RPM. In the case of a transmission wherein sixth gear defines a ratio of transmission input shaft speed (typically equal to engine crankshaft speed) to transmission output shaft speed of about 0.608:1.000, for example, the driveshaft speed at the governed engine speed could be about 3453 RPM, above the driveshaft speed limit of 3000 RPM. In such a situation, the engine speed limit and gear ratio would be associated with a driveshaft overspeed condition and an overspeed protection action signal might be generated, subject to the other factors set forth herein, if shifting to sixth gear is requested by the operator. The same transmission might have a fifth gear defining a ratio of transmission input shaft speed to transmission output shaft speed ratio of about 0.718:1.000, for example, resulting in a driveshaft speed at the governed engine speed limit of about 2924 RPM. Fifth gear in such a system would thus typically not be associated with a driveshaft overspeed condition, and no protection action signal need be generated, as the maximum driveshaft speed would be less than a programmed driveshaft speed limit.

The transmission controller 40 may be configured to receive an engine governed speed limit signal broadcast by the engine controller 30. The transmission controller 40 may be further configured to receive a signal from the operator input device 48 corresponding to a requested gear ratio in the transmission 14. Thus, the existence of a driveshaft overspeed condition, and generation of an overspeed protection action signal, may be based at least in part on these two signals. Controlling the speed of the driveshaft 20 may further include limiting its speed to a selected speed range, as alluded to above, for example a speed below a programmed driveshaft speed limit, by inhibiting operation of the machine 10 with a requested transmission gear ratio responsive to the generated driveshaft protection action signal.

It is contemplated that relatively higher gears, such as sixth gear in the above example, will be available for use during normal operation. This is predicated on ground speed control of the machine 10, which may be used to effectively limit the speed of the driveshaft 20 so long as ground speed control is functioning properly. In other words, so long as ground speed of the machine 10 may be controlled to be less than a ground speed sufficient to overspeed the driveshaft 20, shifting into upper gears otherwise capable of overspeeding the driveshaft 20 at higher engine speeds is not problematic. Driveshaft speed and ground speed are typically linearly related. The present approach, wherein high gears are enabled so long as ground speed control is working, differs from extremely conservative "gear binding" approaches wherein gears capable of overspeeding a driveshaft are made unavailable under all conditions.

As described above, ground speed of the machine 10 may be controlled by controlling engine fueling. Where an irregularity in the ground speed control occurs, however, the overspeed protection action signal may be generated responsive thereto. In other words, generating an overspeed protection action signal may take place responsive to a ground speed control fault condition. This concept may be understood in the context of the ability of the engine controller 30, or some other controller, to measure or report ground speed. If ground speed cannot be measured or reported, for example, because the ground speed sensor 32 has been tampered with, then the engine controller 30 cannot limit ground speed in a conventional manner, ground speed control cannot be used to prevent the driveshaft 20 from overspeeding, and hence protect associated components of machine 10 such as engine 12 and transmission 14.

In one contemplated embodiment, a ground speed control fault condition may be determined based on a ground speed signal failure, such as a signal failure from the ground speed sensor 32 or some other signal failure, or a mechanical or signal failure associated with the fueling controller 24, for example. The transmission controller 40 may receive a ground speed signal broadcast from the engine controller 30, or a signal from the ground speed sensor 32. If the signal is not received as expected, for example for a time period of about five seconds, the transmission controller 40 may determine a ground speed control fault condition and responsively generate a driveshaft protection action signal if the determined engine speed and transmission gear ratio associated with a requested transmission gear correspond to an overspeed condition, as described herein.

It is contemplated that the overspeed protection action signal may include an inhibitory signal associated with the control valve 42 and the clutch 44 as described above, however, alternatives are contemplated. For example, rather than actually inhibiting shifting to a requested gear, an operator or remote monitor may be alerted that the driveshaft 20 may be in an overspeed condition, or risks being in an overspeed condition. A light, buzzer, or other operator perceptible signal might be generated. In still further embodiments, the overspeed condition could simply be logged into electronic storage.

To enable the protection strategy described herein, the transmission controller 40, or a different electronic controller, may be configured via an overspeed protection control algorithm. To this end, the transmission controller 40 may include a computer readable medium such as RAM or ROM having a control algorithm recorded thereon. The control algorithm may include means for generating the protection action signal responsive to the governed engine speed limit signal and the requested gear signal, and also responsive to a ground speed control fault condition, as described herein. The transmission controller 40 may also be programmed with a driveshaft speed limit based on empirical determination of a desired maximum rotational speed of the driveshaft 20, or a computer model-based maximum speed, for example. It should be appreciated that rather than a purely software-based system, dedicated hardware might be used to perform some or all of the control operations described herein. For example, the machine 10 might include an electronic or electromechanical switch associated with a higher gear that changes its state responsive to a ground speed control fault condition.

INDUSTRIAL APPLICABILITY

Figure 2:
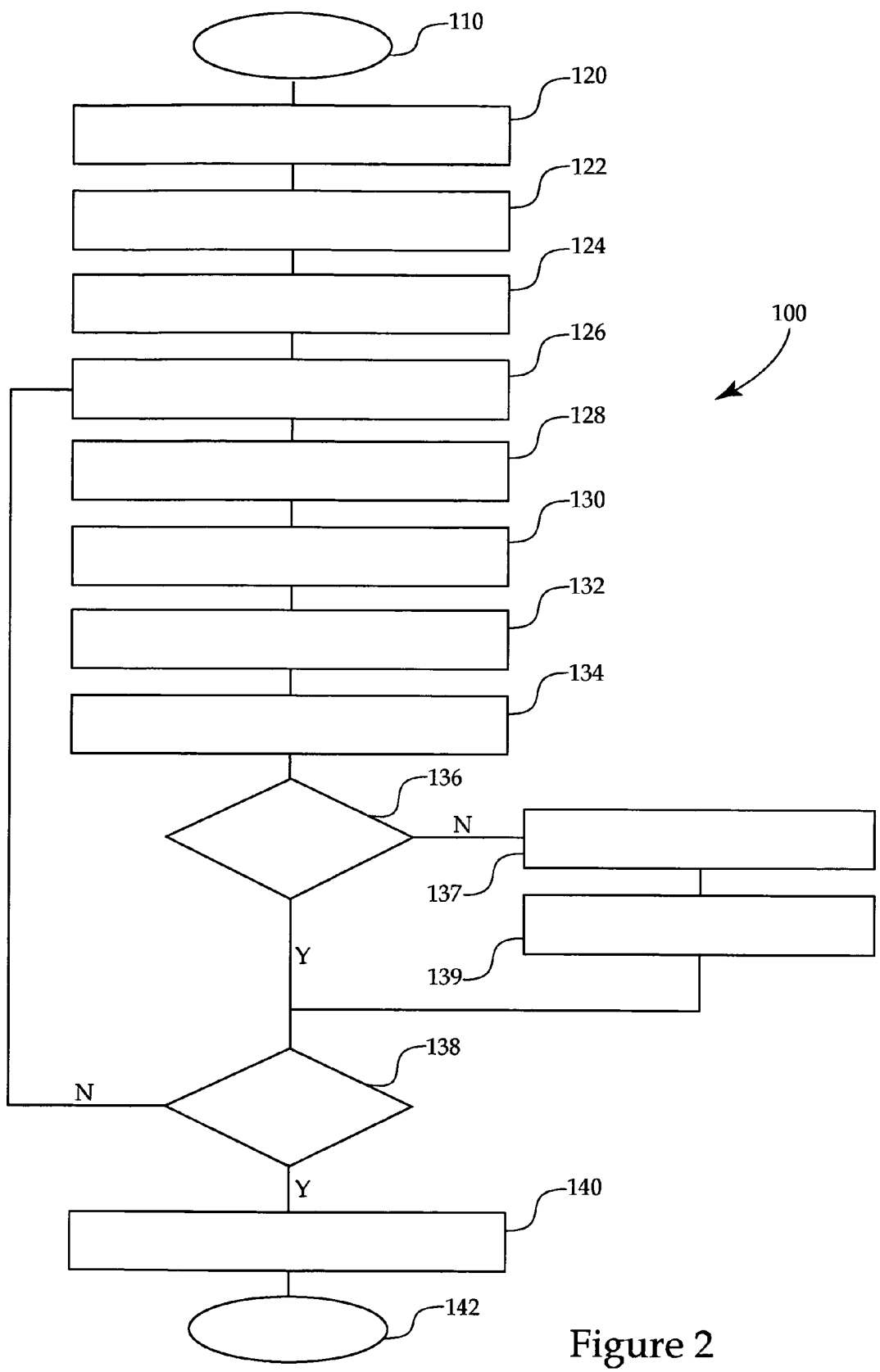
FIG. 2 is a flowchart illustrating a control process according to the present disclosure.

Turning to FIG. 2, there is shown an exemplary control process 100 according to one embodiment of the present disclosure. The control process 100 may begin at Step 110, a START or initialize step. From Step 110, the process may proceed to Step 120, wherein machine 10 is operated in a relatively higher gear. From Step 120, the process may proceed to Step 122, wherein the engine controller 30, for example, may control ground speed of the machine 10 by controlling engine fueling with the fueling controller 24. From Step 122, the process may proceed to Step 124 wherein the transmission controller 40 may receive a downshifting command to shift to a lower gear.

From Step 124, the process may proceed to Step 126 wherein the machine 10 may be operated in the requested lower gear. From Step 126, the process may proceed to Step 128 wherein the transmission controller 40 may receive an upshifting command to re-engage the relatively higher gear. When the request to re-engage the relatively higher gear is received, the transmission controller 40 may responsively read a programmed driveshaft speed limit. From Step 130, the process may proceed to Step 132 wherein the transmission controller 40 may read/receive the engine governed speed limit from the engine controller 30.

From Step 132, the process may proceed to Step 134 wherein the transmission controller 40 may determine whether the requested relatively higher gear may result in overspeeding of the driveshaft 20 at the governed engine speed limit. The determination at Step 134 may take place by actually calculating the maximum possible speed of the driveshaft 20 at the governed engine speed limit, or it might take place by referencing values stored electronically. In other words, the transmission controller 40 may actually calculate the quotient of the governed engine speed limit RPM and the transmission input speed to output speed ratio, as described above, or it might refer to a look-up table or the like to determine if the requested gear is a transmission gear that may result in an overspeed condition.

From Step 134, the process may proceed to Step 136 wherein the transmission controller 40 may determine whether the ground speed signal is as expected. If the ground speed signal from the engine controller 30 is not as expected, e.g. because the engine controller 30 is unable to either receive or broadcast the ground speed of the machine 10, the process may proceed to Step 137 wherein the transmission controller 40 may determine a ground speed control fault condition exists.

From Step 137, the process may proceed to Step 139 wherein the transmission controller 40 may generate an overspeed protection action signal responsive to the ground speed control fault condition, if the requested transmission gear is a gear that is capable of overspeeding the driveshaft 20 at the governed engine speed limit, as determined in earlier Step 134.

Returning to Step 136, if the transmission controller 40 determines that the ground speed control signal is as expected, the process may proceed to Step 138, wherein the transmission controller 40 may determine whether upshifting to the requested relatively higher gear is allowed. Alternatively, if the decision path to Steps 137 and 139 has been followed, from Step 139 the process may also proceed to Step 138. In either event, if at Step 138 a protection action signal has been generated, upshifting will not be allowed, and the process may return to Step 126, or exit. If, at Step 138, upshifting is indeed allowed, the process may proceed to Step 140 wherein transmission controller 140 may command upshifting to the requested relatively higher gear, for instance by commanding a change in the position of the valve 42 to engage the clutch 44.

The present disclosure thus provides a protection strategy for engine 12, transmission 14, and/or associated powertrain components, that expands the range of available operating conditions without sacrificing the robustness and reliability of earlier designs such as gear binding. Rather than simply turning certain gears off, and requiring redlining of the engine 12 to reach relatively higher ground speeds, the present process allows the higher gears to be used so long as ground speed control functions of the machine 10 will protect the driveshaft 20 from operator abuse. As a result, fuel economy may be substantially improved over earlier systems, and gears that would otherwise add useless weight and expense to the powertrain are made available for use. The higher gears whose use might potentially overspeed the driveshaft 20 and result in component damage are only disabled as needed. The present system is also resistant to certain types of tampering. Where some aspect of the ground speed control for the machine 10 is tampered with or damaged, the electronic controllers 30, 40 will be able to determine that ground speed and, hence, driveshaft speed, cannot be limited to protect the driveshaft 20 and associated components, and certain gears may therefore be made unavailable.

It should be appreciated that the question whether ground speed control of a machine will protect its driveshaft from overspeeding may be determined by calculating a driveshaft speed in a particular gear, at particular engine speeds. Because many machines have numerous transmission gears, more than one gear ratio may exist which would allow overspeeding of the driveshaft. Thus, while in certain embodiments, only the highest gear, having a top gear ratio, may be selectively inhibited via the present strategy, in other systems, operation in more than one gear may be selectively inhibited. Further, while it is contemplated that the engine speed of interest when determining whether driveshaft overspeed is possible will be a high idle speed, this need not be the case. "High idle" generally refers to a no load maximum desired engine speed. It is common in on-highway trucks, for example, for the high idle speed to be the maximum governed engine speed, however, in other systems a different engine speed than high idle might be selected as the maximum engine speed, and hence, would be the relevant engine speed limit in determining whether driveshaft overspeed is possible or likely.

The present disclosure provides further advantages over known designs in that it may be implemented entirely with off-the-shelf components, already standard on many machines. Thus, in certain embodiments, the engine 12 will typically already be configured with an engine controller 30 to broadcast signals used in the present strategy. Thus, in such embodiments all that will be necessary is to program an electronic controller such as the transmission controller 40 appropriately such that it will inhibit or resist shifting into certain gears under the conditions discussed herein, and connect it with the engine controller 30 via a conventional datalink. As also described herein, actual inhibition of upshifting to a higher gear is not necessary for a system to fall within the scope of the present disclosure. In alternative embodiments, the overspeed protection action signal may simply record or provide an alert that the driveshaft 20 may be in an overspeed condition, or a risk exists of an overspeed condition.

The present description is for illustrative purposes only, and should not be construed to narrow the breadth of the present disclosure in any way. Thus, those skilled in the art will appreciate that various modifications might be made to the presently disclosed embodiments without departing from the intended spirit and scope of the present disclosure. For instance, while much of the foregoing discussion focuses on the use of the transmission controller 40 and the engine controller 30 to determine whether operation in certain gears should be inhibited, the present disclosure is by no means limited. A single electronic controller could be configured to control all of the operations of the machine 10 described herein. Further, although it is indicated herein that the transmission controller 40 will read a governed engine speed limit broadcast by the engine controller 30, this aspect is also not a limiting feature. The governed engine speed limit ordinarily broadcast by the engine controller 30 might instead be a programmed speed limit available for referencing by the transmission controller 40, or a different controller(s). Other aspects, features and advantages will be apparent upon an examination of the attached drawings and appended claims.

What is claimed is:

1. A method of controlling the speed of a driveshaft in a machine comprising the steps of:
   receiving a requested transmission gear signal associated with a transmission gear ratio;
   determining an engine speed limit;
   determining if the engine speed limit and the transmission gear ratio correspond to a driveshaft overspeed condition;
   generating an overspeed protection action signal if the engine speed limit and the transmission gear ratio correspond to the driveshaft overspeed condition; and
   limiting a driveshaft speed of the machine at least in part via a step of inhibiting operation of the machine in the transmission gear ratio responsive to the overspeed protection action signal.

2. The method of claim 1 wherein the step of limiting the driveshaft speed of the machine further comprises limiting the driveshaft speed of the machine via a step of controlling a machine ground speed, wherein the step of inhibiting operation of the machine in the transmission gear ratio comprises inhibiting operation in the transmission gear ratio responsive to a ground speed control fault condition.

3. The method of claim 2 wherein the step of controlling the machine ground speed comprises controlling engine fueling.

4. The method of claim 3 further comprising the steps of receiving broadcast ground speed signals, and determining the ground speed control fault condition if the broadcast ground speed signals differ from expected signals.

5. The method of claim 2 wherein the step of determining the engine speed limit includes a step of receiving a broadcast governed engine speed limit signal.

6. The method of claim 2 wherein the step of determining if the engine speed limit and the transmission gear ratio correspond to the driveshaft overspeed condition further comprises determining a predicted driveshaft speed associated with a governed engine speed limit and the transmission gear ratio, comparing the predicted driveshaft speed with a driveshaft speed limit, and determining the driveshaft overspeed condition exists if the predicted driveshaft speed is equal to or greater than the driveshaft speed limit, and the ground speed control fault condition exists.

7. The method of claim 6 wherein the step of generating the overspeed protection action signal comprises generating the overspeed protection action signal when the predicted driveshaft speed is above a speed associated with a resonance vibration of the driveshaft.

8. The method of claim 1 further comprising the steps of:
operating the machine in a relatively higher transmission gear;
operating the machine in a relatively lower transmission gear, including disengaging the relatively higher transmission gear;
wherein receiving the requested transmission gear signal associated with the transmission gear ratio includes receiving a request to re-engage the relatively higher transmission gear; and
wherein the step of inhibiting operation of the machine in the transmission gear ratio includes inhibiting re-engaging the relatively higher transmission gear responsive to the overspeed protection action signal that is based at least in part on the engine speed limit and the transmission gear ratio associated with the relatively higher transmission gear.

9. The method of claim 8 further comprising a step of limiting the driveshaft speed of the machine to a selected speed range at least in part via the inhibiting step.

10. The method of claim 9 wherein the inhibiting step further comprises inhibiting re-engaging the relatively higher transmission gear responsive to the overspeed protection action signal that is based at least in part on the engine speed limit, the gear ratio associated with the relatively higher transmission gear and a ground speed control fault condition.

11. The method of claim 10 further comprising the steps of periodically receiving a machine ground speed signal with an electronic controller, and determining the ground speed control fault condition based at least in part on a ground speed signal failure.

12. The method of claim 11 wherein:
the step of determining the engine speed limit comprises periodically receiving with a transmission controller a broadcast governed engine speed signal from an engine controller;
the step of receiving the request to re-engage the relatively higher transmission gear comprises receiving with the transmission controller the requested transmission gear signal from an operator input device;
the method further comprising the steps of determining if the ground speed control fault condition exists, and generating a driveshaft protection action signal responsive to the broadcast governed engine speed signal and the requested transmission gear signal where the ground speed control fault condition exists.

13. A machine comprising:
an engine;
a driveshaft;
a transmission coupled with each of said engine and said driveshaft;
an operator input device configured to output a requested transmission gear signal associated with a gear ratio of said transmission; and
at least one electronic controller coupled with said transmission and with said operator input device, said at least one electronic controller being configured via an overspeed protection control algorithm to generate an overspeed protection action signal responsive to the requested transmission gear signal and an engine speed limit, if the gear ratio associated with the requested transmission gear signal and the engine speed limit correspond to a driveshaft overspeed condition, wherein said overspeed protection action signal comprises an inhibition signal associated with a transmission gear, wherein said at least one electronic controller is configured to control a around speed of said machine, and further configured to generate said inhibition signal responsive to a ground speed control fault condition.

14. The machine of claim 13 wherein said at least one electronic controller includes an engine controller operably coupled with said engine and configured to control machine ground speed, and a transmission controller operably coupled with said transmission, said transmission controller being configured to receive a machine ground speed signal from said engine controller and to determine said ground speed control fault condition responsive to a ground speed signal failure.

15. The machine of claim 13 wherein said transmission further comprises at least two gears, including a high gear, and an electro-hydraulic control valve configured to control an engagement of said high gear, said at least one electronic controller further being configured to selectively disable said electro-hydraulic control valve responsive to said inhibition signal.

* * * * *